United States Patent [19]

Jones et al.

[11] 4,316,193
[45] Feb. 16, 1982

[54] SERVO LOOP PROCESSOR

[75] Inventors: Philip Jones, Bothell; Moorfield Storey, Jr., Seattle, both of Wash.

[73] Assignee: The Boeing Company, Seattle, Wash.

[21] Appl. No.: 80,533

[22] Filed: Oct. 1, 1979

Related U.S. Application Data

[63] Continuation-in-part of Ser. No. 488,401, Jul. 15, 1974, abandoned.

[51] Int. Cl.³ .............................................. G01S 3/02
[52] U.S. Cl. ................................ 343/112 D; 343/7 A
[58] Field of Search ............................ 343/112 D, 7A

[56] References Cited

U.S. PATENT DOCUMENTS

| | | |
|---|---|---|
| 2,519,521 | 8/1950 | Weighton . |
| 2,592,459 | 4/1952 | Perilhou . |
| 2,668,288 | 2/1954 | Perilhou . |
| 2,677,820 | 5/1954 | Bouzitat et al. . |
| 3,577,146 | 5/1971 | Freier et al. . |
| 3,604,003 | 9/1971 | Freier et al. . |
| 3,687,556 | 8/1972 | Price et al. . |
| 3,688,313 | 8/1972 | Kern .................................. 343/7 A |
| 3,789,410 | 1/1974 | Smith et al. . |

*Primary Examiner*—Theodore M. Blum
*Attorney, Agent, or Firm*—Christensen, O'Connor, Johnson & Kindness

[57] ABSTRACT

A servo loop processor suitable for use in a passive radar range determining system is disclosed. Early and late overlapping video pulse trains derived from spaced receiving antennas are fed to separate first and second channels and are sampled and held from pulse period to pulse period to form signals representing the amplitude envelopes of the received pulse trains. The output of the first channel is variably delayed and the delayed signal is compared with the undelayed output of the second channel to create an error signal. The output of the second channel is also differentiated, and the result is sampled and held to create a reference signal that has the proper phase relationship with the error signal so that the error signal can be multiplied by the reference signal to create a correction signal. The resulting correction signal is integrated and fed back to control the time delay applied to the output of the first channel such that a closed servo loop is formed. At balance, the integrated correction signal is related to the distance between the radar antenna transmitting the pulse trains, and the receiving antennas. In an alternative embodiment, envelope signals representing the first and second channel pulse trains are converted from analog to digital form, and the digitized second channel output is subtracted from the same digitized signal delayed by a fixed interval to form a digital version of the above-mentioned reference signal. A digital version of the error signal, derived as above, is then multiplied by the digital reference signal to create a digital correction signal, which after integration, controls the time delay of the first channel output signal.

22 Claims, 5 Drawing Figures

SERVO LOOP PROCESSOR

CROSS-REFERENCE TO RELATED APPLICATION

This is a continuation-in-part application of Ser. No. 488,401 filed July 15, 1974, for SERVO LOOP PROCESSOR by Philip Jones and Moorfield Storey, Jr. now abandoned.

BACKGROUND OF THE INVENTION

This invention is directed to range determining systems and, more particularly, to passive radar range determining systems.

In certain military environments, it is desirable to be able to passively, readily and rapidly, determine the range from an object, such as an aircraft, to a radiating radar antenna. It may be desirable, for example, to know this information in order to destroy the antenna. While this information can be obtained utilizing standard triangulation techniques wherein an aircraft flies a base line between two different locations in order to obtain direction information, such a procedure is time consuming and, therefore, undesirable.

In order to overcome the above-noted problem, it has been proposed to utilize two receiving antennas mounted on a single aircraft and determine the time difference (time shift) between receipt of signals by the two antennas in order to determine the range between the aircraft and the transmitting antenna. However, prior to the present invention no satisfactory apparatus for determining the very small time difference involved has been proposed. More specifically, the major difficulty with using this technique relates to the fact that the spacing between the two antennas, and the frequency of the received video pulse train, is such that the signals received by the two antennas overlap to the degree that they are almost superimposed. The resultant very small time shift between the two signals is difficult to measure using classical circuits.

Therefore, it is an object of this invention to provide a processor suitable for determining the time shift between overlapping nearly identical signals.

It is a further object of this invention to provide a processor suitable for use in a passive radar ranging system for determining the time shift between the envelopes of two overlapping video pulse trains.

It is a further object of this invention to provide a processor suitable for measuring the extremely small time shift between pulse train envelopes which are of narrow but non-zero bandwidths, and overlap in time.

SUMMARY OF THE INVENTION

In accordance with principles of this invention a processor suitable for use in a passive radar range determining system is provided. The processor receives two nearly identical, slightly time shifted, but overlapping, pulse trains. A signal representing the amplitude envelope of the early arriving pulse train is controllably time delayed with respect to a signal representing the envelope of the late arriving pulse train and the time delayed early envelope signal is compared with the late envelope signal. From such comparison an error signal is developed which is multiplied by a reference signal, derived from the late envelope signal. The result of the multiplication is a correction signal that is utilized in a closed loop servo to control the amount of time delay applied to the early envelope signal. When the result of the above comparison approaches zero, the amount of delay is directly related to the range or distance of the devices that receive the transmitted signal pulse to the source of the transmission. In one use, the pulse trains are video pulses created by a radar transmitting antenna and they are received by spaced receiving antennas located, for example, on an aircraft.

In accordance with one embodiment of this invention, the processor comprises first and second sample-and-hold circuits, one located in each channel. The first and second sample-and-hold circuits are triggered in a manner such that their outputs are stair-stepped representations of the envelopes of the received pulse trains.

Further in accordance with the above embodiment of the invention, the output of the first sample-and-hold circuit is time delayed by a third sample-and-hold circuit and then compared with the output of the second sample-and-hold circuit by a differential amplifier to create an error signal. A multiplier multiplies the error signal with the properly phased reference signal derived from the second sample-and-hold circit to create a correction signal. The correction signal is integrated and used to control the time delay created by the third sample-and-hold circuit.

Still further in accordance with the above-mentioned embodiment of the invention, the output of the second sample-and-hold circuit is differentiated and the results of the differentiation are applied to a fourth sample-and-hold circuit. The fourth sample-and-hold circuit is timed so as to sample the differentiated signal slightly after the outputs of the receivers are sampled by their respective first and second sample-and-hold circuits so as to in essence perform a subtraction function, in which the resulting reference signal is equal to the difference between the second channel signal envelope at the output of the second sample-and-hold circuit and the same signal envelope delayed by a time interval approximately corresponding to the pulse repetition interval.

In an alternative embodiment of the invention, the reference signal is derived from the envelope of the second channel pulse train by applying a fixed delay to the second channel envelope signal and then by subtracting the delayed second channel envelope signal from the undelayed version of the same signal. The resulting difference represents the reference signal which in turn is multiplied, as above, with the error signal to produce the correction signal. The fixed delay interval is selected so that the resulting reference signal has the above-mentioned predetermined phase relationship so that when multiplied by the error signal, effective servo loop operation is achieved.

Additionally, in this alternative embodiment the second channel fixed delay is set at $2\tau$, and an added $1\tau$ fixed delay is inserted in the first channel in series with the controllable delay. The error signal is produced by comparing the first channel envelope signal delayed by both the controllable delay and the fixed $1\tau$ delay, with the second channel envelope signal delayed by $1\tau$. As explained herein, the addition of these fixed delays in series with each of the first and second channel signal processing circuits, causes the processor to reach a balanced condition precisely when the magnitude of the controlled delay in the first channel causes coincidence of the early and late signal envelopes even in the presence of slight and unavoidable differences in the amplitudes of the received first and second pulse train signals and their associated envelopes.

Another feature of the present invention incorporated in the above-mentioned alternative embodiment is the provision in the first and second channels of analog-to-digital converters for converting the pulse envelopes to first and second channel digital signals. In association therewith, the processor circuitry for developing the reference signal and the error signal, and the circuit components for multiplying such signals and for integrating the resulting correction signal, are digital circuits that carry out these functions as digital, rather than analog, operations.

It will be appreciated from the foregoing description that the invention basically comprises a servo loop processor. The processor delays the output of one channel of a dual channel receiver system with respect to the other channel. The time delay period is determined by, in essence, a comparison between the delayed signal and the undelayed signal. When loop balance occurs, the loop delay is related to range. The properly phase reference signal is needed for successful loop operation and is derived from the output signal of one of the channels. While the invention is suitable for use in various environments, it is particularly suitable for use in a passive radar range determining system wherein the signals in the channels are overlapping to the degree that they are almost superimposed.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
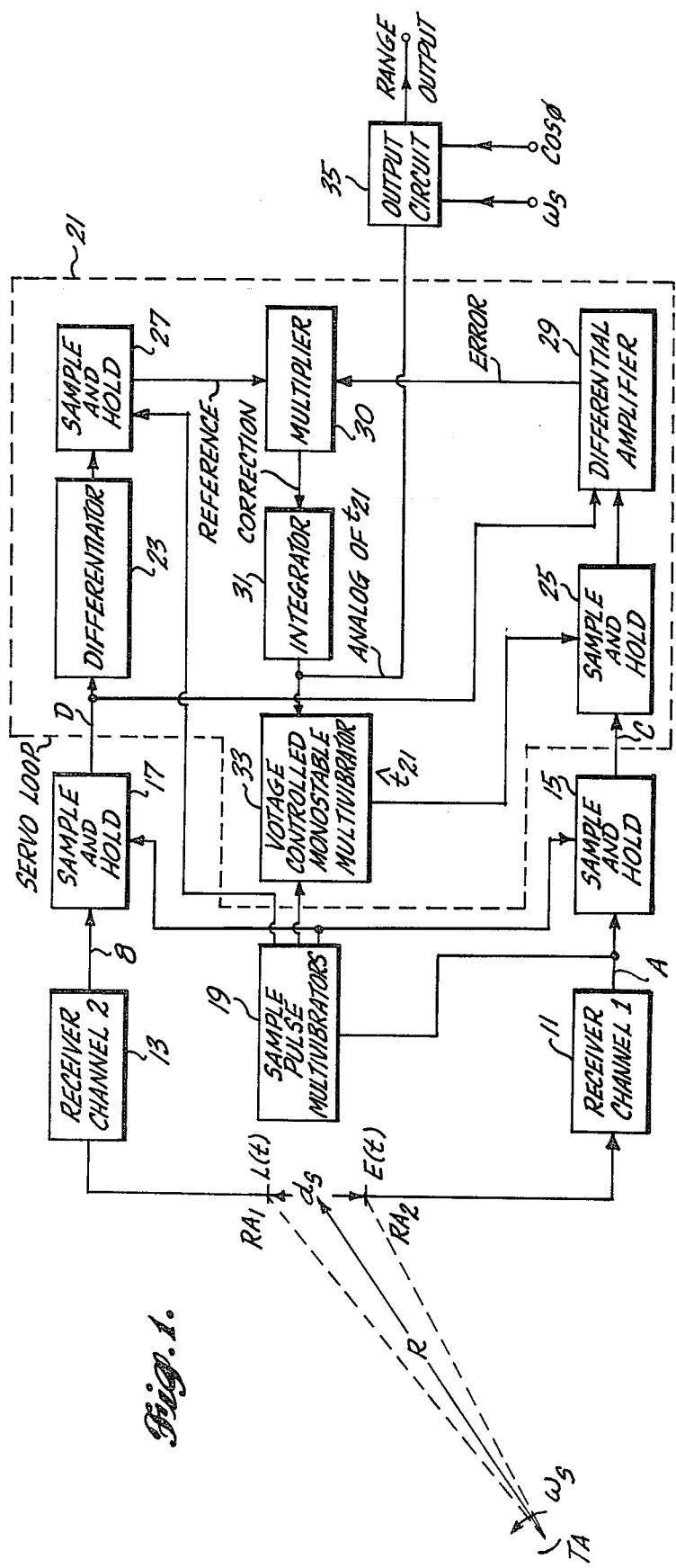
FIG. 1 is a block diagram of a passive radar range determining system including one embodiment of the present invention.

FIG. 1 illustrates a first receiver 11 and a second receiver 13 connected to a servo loop processor formed in accordance with the invention. The first receiver 11 is connected to receive a signal from a first radar antenna designated $RA_2$, and the second receiver 13 is connected to receive a signal from a second radar antenna designated $RA_1$. $RA_1$ and $RA_2$ are spaced from one another; for example, they may be located on the tips of the wings of an aircraft.

$RA_1$ and $RA_2$ receive identical video pulse trains generated by a rotating radar transmitting antenna designated TA. TA rotates at an angular velocity designated $\omega_s$. TA is illustrated as rotating in a counterclockwise direction, and $RA_1$ and $RA_2$ are illustrated such that the radar beam hits $RA_2$ before $RA_1$. Obviously, as will be better understood from the following description, this direction of rotation, and the resultant relationship relating to receiving antenna radar beam impingement can be diametrically changed without affecting the operation of the invention.

For purposes of discussion, the distance or range between TA, and $RA_1$ and $RA_2$ is designated R, and the distance between $RA_1$ and $RA_2$ is designated $d_s$. As will be appreciated by those skilled in the art and others, $d_s$ is smaller than R by a number of orders of magnitude. Thus, in essence, R can be represented by:

$$R = d_s \cos \phi / t_{21} \omega_s \qquad (1)$$

where $\cos \phi$ equals the angle of arrival of the incoming signal relative to the broadside of $RA_1$ and $RA_2$, $d_s$ and $\omega_s$ are as indicated above, and $t_{21}$ is the time for the beam of the transmitting antenna to scan the region subtended by the receiving antennas.

Due to the position of $RA_1$ and $RA_2$, and the direction of rotation of TA, the amplitude modulaton on the video pulse train received by $RA_1$ is delayed relative to the modulation received by $RA_2$. Thus, for purposes of discussion, the signal received by $RA_2$ is designated E(t) and the signal received by $RA_1$ is designated L(t). In other words, $E(t) = L(t + t_{21})$.

The servo loop processor of the invention comprises: first and second sample-and-hold circuits 15 and 17; sample pulse multivibrators 19; and, a servo loop 21. The servo loop 21 comprises: a differentiator 23; third and fourth sample-and-hold circuits 25 and 27; a differential amplifier 29; a multiplier 30; an integrator 31; and a voltage controlled monostable multivibrator 33.

The output of the first receiver 11 is connected to the input of the first sample-and-hold circuit 15; and, the output of the second receiver 13 is connected to the input of the second sample circuit 17. The output of the first receiver 11 is also connected to the input of the sample pulse multivibrators 19. The sample pulse multivibrators 19 comprise a series of multivibrators adapted to generate a series of timing pulses in sequence each time a video radar pulse occurs on the output of the first receiver 11.

The sample multivibrators are illustrated as having three outputs. One output is connected to the sample command inputs of the first and second sample-and-hold circuits 15 and 17. The second output is connected to the sample command input of the fourth sample-and-hold circuit 27. The third output is connected to the trigger input of the voltage controlled monostable multivibrator 33.

The output of the second sample-and-hold circuit 17 is connected to the input of the differentiator 23 and to one input of the differential amplifier 29. The output of the differentiator 23 is connected to the input of the fourth sample-and-hold circuit 27 and the output of the fourth sample-and-hold circuit 27, designated REFERENCE, is applied to one input of the multiplier 30.

The output of the first sample-and-hold circuit 15 is connected to the input of the third sample-and-hold circuit 25. The output of the third sample-and-hold circuit 25 is connected to the second input of the differential amplifier 29.

The output of the second differential amplifier 29, designated ERROR, is applied to the second input of the multiplier 30. The output of the multiplier 30, designated CORRECTION, is applied to the input of the integrator 31. The output of the integrator 31 is connected to the voltage variable input of the voltage controlled monostable multivibrator 33. The output of the voltage controlled monostable multivibrator 33 is connected to the sample command input of the third sample-and-hold circuit 25. The output of the integrator is also connected to one input of the output circuit 35. The output circuit 35 electronically performs the calculation defined by equation (1) and also receives signals designated cos $\phi$ and $\omega_s$. Cos $\phi$ is obtained from a suitable direction finder circuit (not illustrated) and $\omega_s$ is obtained from a suitable sensing circuit (also not illustrated) adapted to sense the rotational rate of TA and generate a suitable signal related thereto. The output circuit is connected to an output terminal designated RANGE OUTPUT.

Figure 2:
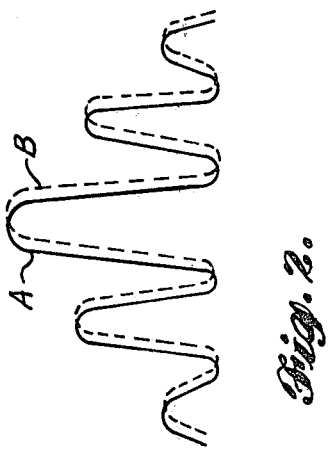
FIG. 2 is a waveform diagram illustrating the outputs of two receivers connected to space antennas adapted to receive identical radar signals.

Turning now to a description of the operation of the embodiment of the invention illustrated in FIG. 1, as discussed above, RA$_2$ and RA$_1$ both receive the video pulse trains which are identical except that the envelope of RA$_1$ is time delayed from that of RA$_2$. The first and second receivers 11 and 13 receive and amplify their respective video pulse train signals. FIG. 2 illustrates the envelopes of the outputs of these receivers. Waveform A represents the output of the first receiver 11 and waveform B represents the output of the second receiver 13. As will be understood by those skilled in the art the waveforms A and B include the main lobe and the side lobes of the envelopes of the pulse trains received by RA$_1$ and RA$_2$. Each pulse that occurs on the output of the first receiver 11 triggers the sample pulse multivibrators 19 causing them to immediately apply a sample command to the first and second sample-and-hold circuits 15 and 17. Thus, the outputs of the first and second sample-and-hold circuits 15 and 17 (designated C and D, respectively) are stair-stepped waveforms of the envelopes of the outputs of the first and second receivers.

The differentiator 23 is basically an RC network with a time constant short compared to the PRI (pulse repetition interval) of the received video pulse train. Preferably, the differentiator comprises a series connected capacitor having its output (the end nearest the fourth sample-and-hold circuit 27) connected through a resistor to ground. Since the output of the second sample-and-hold circuit 17 changes in a stair-step fashion, the output of the differentiator is a bipolar pulse train, one pulse occurring each time a step occurs. This bipolar pulse train is sampled slightly after the first and second sample-and-hold circuits sample their respective inputs, i.e. the sample pulse multivibrators 19 trigger the fourth sample-and-hold circuit 27 slightly after the first and second sample-and-hold circuits 15 and 17 are triggered. The timing is such that the fourth sample-and-hold circuit 27 samples the output of the differentiator at, or very close to, the top of each positive polarity pulse, and at or close to the bottom of each negative going pulse. It will be appreciated from this description that the differentiation in combination with the fourth sample-and-hold circuit 27 forms a subtractor circuit having an output of a reference signal that represents the difference between the envelope signal output at D, and the same envelope signal delayed by an amount approximating the pulse repetition interval (PRI). The REFERENCE signal is applied as the input to the multiplier 30. It will be further appreciated by those skilled in the servo control art that the REFERENCE signal applied to the multiplier input has the appropriate phase relationship with the error signal so that the servo loop formed by the differential amplifier, multiplier, integrator and voltage controlled monostable multivibrator possesses the S-curve necessary for its successful operation.

During the foregoing operations, the third sample-and-hold circuit 25 is sampling the output of the second sample and hold circuit 17. However this sampling is delayed by the operation of the voltage controlled monostable multivibrator 33. More specifically, the sample pulse multivibrators 19 trigger the voltage controlled monostable multivibrator 33 immediately upon the occurrence of each pulse on the output of the first receiver 11, or slightly thereafter, depending upon the nature of the voltage controlled monostable multivibrator. At the same time the integrator 31 is applying a slowly varying DC control voltage to the control input of the voltage controlled monostable multivibrator. The level of the control voltage controls the unstable state of the voltage controlled monostable multivibrator. Thus, in operation, the trigger signal switches the voltage controlled monostable multivibrator into its unstable state and the output of the integrator controls how long it stays in that state. When it returns to its stable state a sample command is applied to the third sample-and-hold circuit 25. Thus, the level of the output of the integrator time delays the triggering of the third sample-and-hold circuit. The delay is designated $\hat{t}_{21}$.

The differential amplifier 29 compares the stair-stepped envelope waveform at the output (D) of the second sample-and-hold circuit 17 with the stair-stepped envelope waveform at the output (C) of the first sample-and-hold circuit 15, as delayed by the third sample-and-hold circuit 25, and, in accordance therewith, generates an ERROR signal. The ERROR signal is applied to the second input of the multiplier 30. The multiplier 30 multiplies the REFERENCE and ERROR signals and creates a fluctuating DC CORRECTION signal. The CORRECTION signal is integrated by the integrator and applied to the control input of the voltage controlled monostable multivibrator to control its operation in the manner previously described.

When the servo loop is balanced, the ERROR signal becomes zero. Thus, the CORRECTION signal, averaged over time, becomes zero. As will be understood by those skilled in the art, the integration of a zero level signal causes a constant to be generated. Thus, when loop balance is achieved, the output of the integrator is constant, and the related time delay created by the third sample-and-hold circuit becomes constant. Obviously, if RA$_1$ and RA$_2$ are moving with respect to TA (as they would be if mounted on an aircraft) the loop will never become exactly balanced. However, at any instant in time the output of the integrator will still be related to R.

Figure 3:
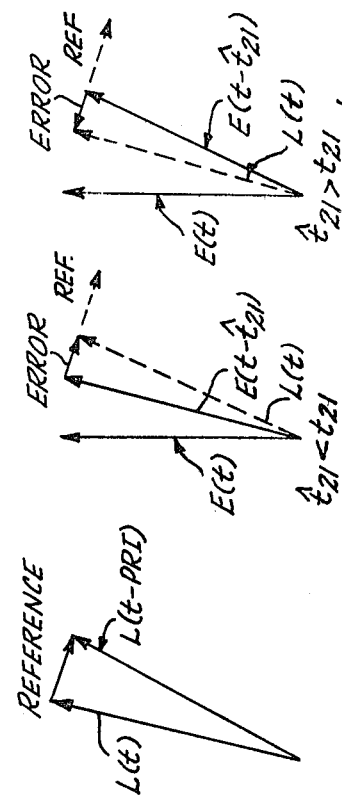
FIG. 3 is a series of phase diagrams illustrating the relationship between various signals of the system for various sets of conditions.

The generation of the CORRECTION signal is best understood by considering the servo loop's response to video pulse trains with sinusoidal amplitude modulation and an inter-envelope time shift of $t_{21}$ seconds. The differential amplifier output (the ERROR signal) is essentially in phase quadrature with the late channel [L(t)] modulation envelope, as shown in the phasor diagrams (FIG. 3). The amplitude is proportional to the magnitude of $t_{21} - \hat{t}_{21}$, and the phase indicates the sense or direction of the error. Multiplying the ERROR signal by the REFERENCE signal (which is a quasiderivative signal also essentially in phase quadrature with the late channel modulation envelope) produces the pulsating DC CORRECTION signal. The magnitude and polarity of the time integrated CORRECTION signal indicate the amount and the sense, respectively, of the error.

When the servo loop is balanced, the output of the integrator 31 is an analog of the time shift between signals A and B, i.e., it is an analog of $t_{21}$. This signal, when combined with a signal representing $\cos\phi$, a signal representing $\omega_s$ and a suitable constant relating to $d_s$, in accordance with the formula set forth above, will form a signal directly related to the range, R, between the receiving antennas $RA_1$ and $RA_2$, and the transmitting antenna TA. As discussed above, the output circuit 35 performs this mathematical function. Since various multiplication and division circuits suitable for performing the function of the output circuit are well-known in the art, a specific one is not illustrated and described herein.

Figure 4:
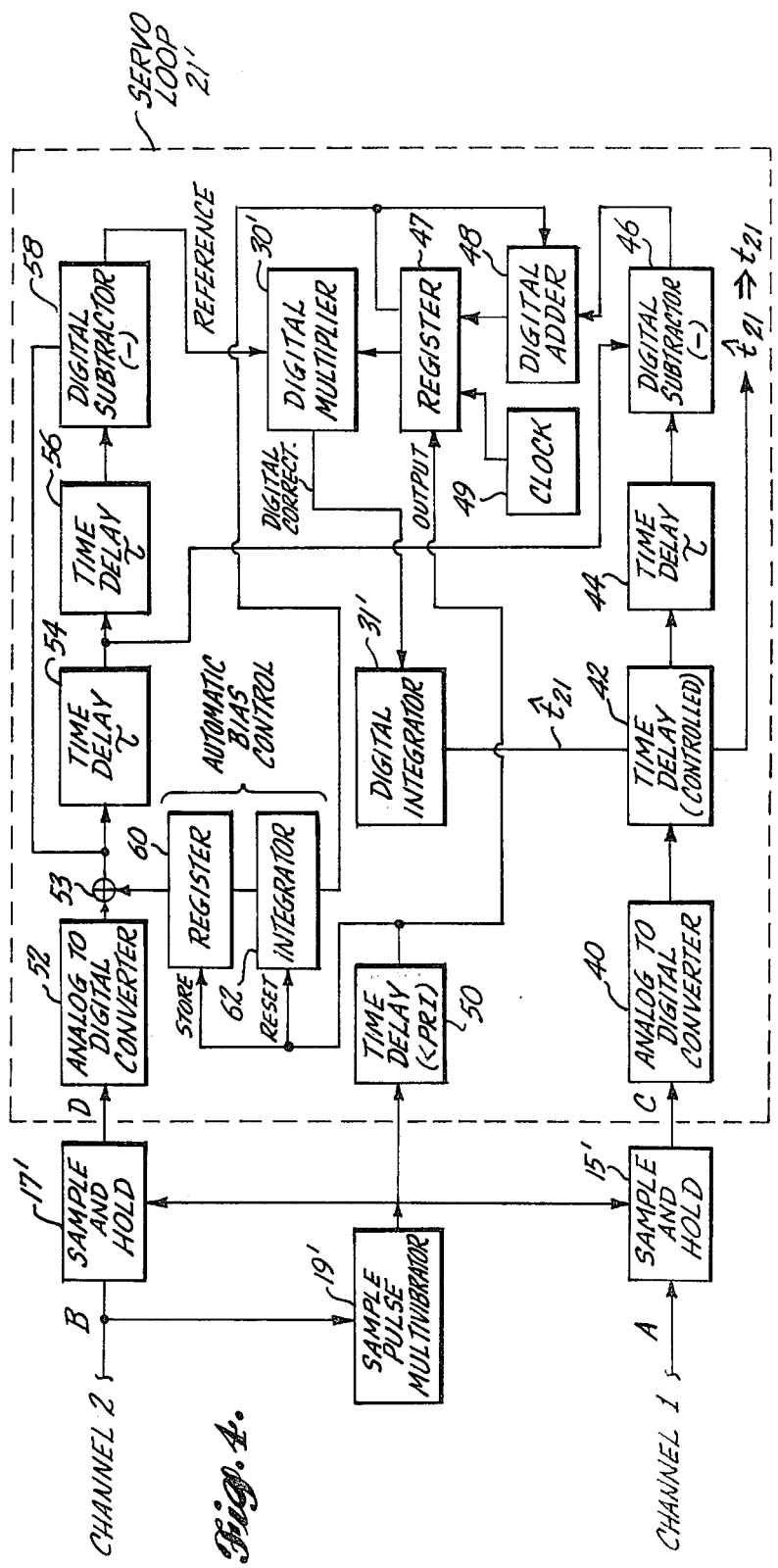
FIG. 4 is a block diagram of an alternative and presently preferred embodiment of the passive radar range determining system of the invention.

With reference to FIG. 4, an alternative and presently preferred embodiment of the invention is shown in which the range related time interval $t_{21}$ is measured by a servo loop 21', similar to servo loop 21 of FIG. 1, but differing therefrom in a number of significant respects as explained more fully below. Servo loop 21' receives the first and second channel pulse train signals at A and B from receiving antennas and associated first and second channel receivers such as antennas $RA_1$ and $RA_2$, and receivers 11 and 13 as shown in FIG. 1 and described above. The received pulse trains, modulated in amplitude by the direction sensitive lobes of the receiving antennas, are applied to first and second channel sample-and-hold circuits 15' and 17', corresponding to circuits 15 and 17 described above in connection with FIG. 1. Thus, the channel 1 pulse train signal at A is applied to sample-and-hold circuit 15', and the associated sample command input of circuit 15' is triggered at the pulse repetition interval, by a sample pulse multivibrator 19', causing a circuit 15' to output at C a stepwise representation of the envelope of the amplitude modulated pulse train received by channel 1. Similarly, the channel 2 signal is applied to sample-and-hold circuits 17' which has its associated sample command input connected to multivibrator 19' to develop at output D, a stepwise representation of the channel number 2 pulse train envelope. An input for multivibrator 19' is connected in this embodiment to point B, of channel number 2, which corresponds to the late arriving pulse train signal. Multivibrator 19' is thus triggered by the late channel pulses, and causes the sample-and-hold circuits 15' and 17' to sample their respective first and second channel signals at times synchronized to the late channel pulses, rather than being synchronized to the early or number 1 channel pulses as in the case of multivibrator 19 of the embodiment shown in FIG. 1. Since the pulse repetition interval is the same in either case, the sample pulse multivibrator 19' of FIG. 4 (or multivibrators 19 of FIG. 1) cooperate with the associated sample-and-hold circuits to provide essentially the same envelope detection function.

The channel number 1 components of servo loop 21' of FIG. 4 include the serial connection of an analog-to-digital converter 40, a controllable time delay 42, a fixed time delay 44 providing a predetermined delay $\tau$, a digital subtractor 46, and a register 47, digital adder 48, clock 49 and a delay 50 which together function as a dumped integrator. The analog envelope signal at output C is applied to the input of A/D converter 40 which transforms the analog signal to a digitally encoded signal, while retaining the same signal information available from the analog output of sample-and-hold circuit 15'. The digitally encoded signal is variably delayed by $\hat{t}_{21}$, and then passed on to fixed time delay 44, where the signal is further delayed by an interval $\tau$. Now the digital signal representing the channel number 1 envelope has been delayed by $\hat{t}_{21}+\tau$, and is fed to one input of a digital subtractor 46. The other digital input of subtractor 46 receives a similar digitally encoded signal derived from channel 2, representing the envelope of the late channel pulse train, and the digital difference between these two inputs is produced at the output of subtractor 46. Digital adder 48 receives the digital difference from subtractor 46 and at clocked intervals determined by clock 49 successively adds (or subtracts in a bipolar fashion) the output of subtractor 46 to the contents of clocked register 47 which then stores the new value. Thus during a given PRI, adder 48 and register 47 cause the contents of register 47 to increase or decrease in a step-wise fashion at a rate of change determined by the magnitude of the digital difference computed by subtractor 46 and the clock rate of clock 49, which by way of example may be a $1\mu$ second rate. The value of the contents in register 47 is outputted to multiplier 30' once every PRI, by a timing pulse from delay 50, at a time just prior to the receipt of the early and late channel envelope signals at A and B. Also, at such time, the contents of register 47 are dumped and the incrementing (or decrementing) begins anew for the succeeding PRI. The periodic output of register 47 provides the digital error signal that is applied as one input to multiplier 30'.

With respect to channel 2, servo loop 21' includes the serial connection of another analog-to-digital converter 52, a digital summing junction 53, a first fixed time delay 54 having a delay of $\tau$, a second fixed time delay 56 again providing a delay of $\tau$, and an additional digital subtractor 58 having on input connected to the output of delay 56 and another input connected to the output of A/D converter 52. Converter 52 transforms the envelope of the late or second channel pulse train signal as developed at D, into a digitally encoded signal which is delayed first by an interval $\tau$ in delay 54, and then again an additional delay of $\tau$ in delay 56 and thence fed as one input to digital subtractor 58. The other input of subtractor 58 receives the undelayed digitally encoded output from converter 52. Subtractor 58 thus produces a digitally encoded signal representing the difference between the digitized but undelayed envelope signal in channel 2, and the same digitized signal delayed by a fixed interval equal to $2\tau$. That digital difference signal forms the reference signal shown at the output of subtractor 58 and is used in servo loop 21' to enable the servo processor to attain a stable, balanced condition. To eliminate a small dc difference signal that unavoidably occurs between the early and late channels due to the use of logarithmic receiving amplifiers, an automatic biasing control is added to the processing circuitry, in the form of register 60 and integrator 62. In response to the changing contents of error register 47, integrator 62 time averages the error and the thusly averaged or dc error component is stored in register 60 on command of a timing signal from delay 50. The stored contents of register 60 are added by digital summing junction 53 to the late channel digital signal to bias out the dc offset.

For completing servo loop 21', a digital multiplier 30', (corresponding to the analog multiplier 30 of FIG. 1) receives and digitally multiplies the error and reference signals. The resulting digital correction signal is integrated by a digital integrator 31', corresponding to analog integrator 31 of FIG. 1. The time integrated output of integrator 31' is related to the controlled time delay $\hat{t}_{21}$ and is connected to control delay 42 and to produce a signal representing $\hat{t}_{21}$ which during a balanced condition of the servo loop approaches $t_{21}$ representing the time interval between the early and late channel pulse trains, and from which the range is computed. The form of the signal producing the output representing $\hat{t}_{21}$ may be either analog or digital.

Figure 5:
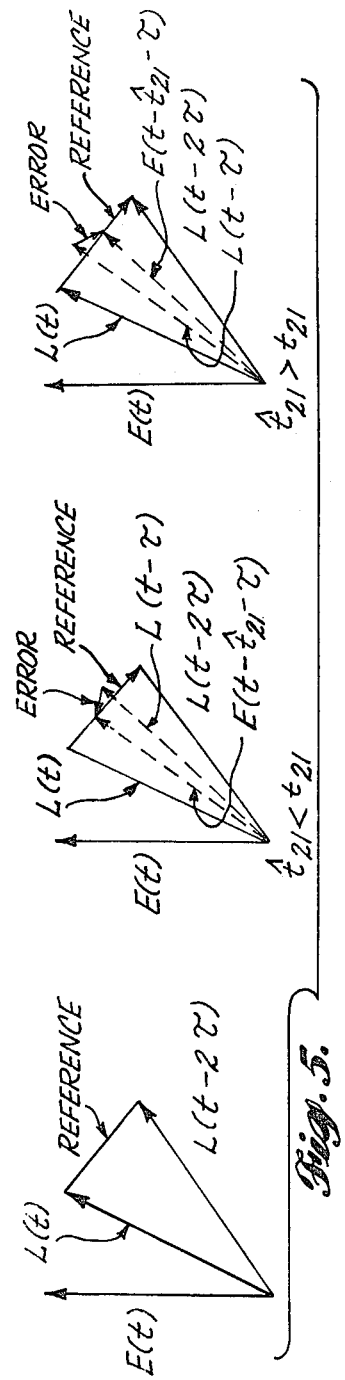
FIG. 5 encompasses a series of phase diagrams, similar to those of FIG. 3, illustrating the relationship between the various signals of the embodiment of the system as shown in FIG. 4, for different operating conditions.

The operation of the servo loop 21' is diagramatically depicted in FIG. 5 by a set of three phasor diagrams, which are similar to the set of phasor diagrams described above in connection with FIG. 3. Although phasor diagrams are more commonly used to represent sinusoidally varying analog signals, as in the case of the diagrams of FIG. 3 representing the analog signals of the FIG. 1 servo loop, the phasor diagrams of FIG. 5 are used to represent the digitally encoded signals developed in servo loop 21' inasmuch as these digital signals contain essentially the same information as the analog servo loop 21 of FIG. 1.

Thus in the first phasor diagram of FIG. 5, the early arriving signal E(t) is shown in an upright position of rotation, and the late arriving signal L(t) is shown at a slightly rotated position relative to E(t). These signals maintain the same angular separation as they rotate 360° at the sinusoidal frequency of the respective pulse train envelopes. Also in this first phasor diagram, the delayed late arriving signal L(t-2τ) is shown at a position of additional rotation relative to the undelayed L(t), and the difference between these signals (produced by subtractor 58) is shown as a phasor reference signal.

Now as illustrated in the second and third diagrams of FIG. 5, servo loop 21' splits the total delay of 2τ in the late channel path into two fixed delays 54 and 56, of 1τ each, and inserts an added fixed delay 44 in the early channel, following the controlled delay 42, in which delay 44 is selected to equal ½ the total late channel delay, or ½ of 2τ=τ. By selecting a value for τ equal to that of the pulse repetition interval (PRI), and by comparing the early channel signal delayed by the variable delay 42 and the fixed delay (τ) of delay 44, with the late channel signal delayed by (τ) of delay 54, subtractor 46, adder 48 and register 47 produce an error signal that approaches zero when the applied delay $\hat{t}_{21}$ equals the actual time separation $t_{21}$ between the early and late channel signals, even though the amplitudes of the late and early channel signals are not exactly equal. This compensation for unequal amplitudes of E(t) and L(t) is illustrated in the second and third phasor diagrams of FIG. 5, in which the error signal is shown as being derived from the difference between L(t-τ) and E(t-$t_{21}$-τ). As the error signal approaches zero (i.e., as $\hat{t}_{21}$ approaches $t_{21}$), the phasor error signal is located approximately midway along the reference phasor. When the error phasor is multiplied by the reference phasor by digital multiplier 30', only the component of the error signal lying along or parallel to the reference phasor will contribute to the digital correction signal produced by multiplier 30' and passed on to digital integrator 31'. Accordingly, any lack of phase correspondence between the error signal and the reference signal due to difference in amplitudes between E(t) and L(t), caused for example, by different gains in the first and second channel receivers, and/or lack of exact quadrature between L(t) and the reference signal, will not affect the accuracy of the servo loop 21' when it attains a balanced or null condition.

As in the case of FIG. 3, the second and third phasor diagrams of FIG. 5 are similar and represent the opposing polarity conditions of the digital correction signal resulting from the multiplication of the error and reference phasors. In the second diagram, the error phase is 180° out of phase with the reference phasor and the correction signal resulting from the multiplication of these out-of-phase signals demands that the integrator 31' increase the delay $\hat{t}_{21}$ effected by delay 42. Conversely, the third diagram of FIG. 5 represents the in-phase condition between the error and reference phasors, resulting in a correction signal that causes integrator 31' to decrease the delay $\hat{t}_{21}$ in order to balance the loop.

It will be appreciated from the foregoing description that the invention provides a servo loop processor adapted to determine the time delay between a pair of overlapping signals. The invention is primarily of use in the environment described. That is, it is primarily of use in passive radar ranging systems suitable for determining the location of a radar antenna with respect to another object such as an aircraft. However, the invention is also suitable for use in other environments.

While certain preferred embodiments of the invention have been illustrated and described, it will be appreciated by those skilled in the art and others that various changes can be made therein without departing from the spirit and scope of the invention. Hence, the invention can be practiced otherwise than as specifically described herein.

We claim:

1. A servo loop processor suitable for use in determining the time shift between first and second like signals, said first signal occurring in time prior to said second signal, said servo loop processor comprising:

controllable delay means, connected to receive said first signal, for delaying said first signal, said controllable delay means having a delay control input;

comparison means for receiving said second signal and being coupled to the output of said delay means for receiving said delayed first signal, and for comparing said delayed first signal with said second signal and generating an error signal relating to the difference therebetween;

reference producing means for receiving said second signal, and for producing a reference signal in accordance therewith;

multiplier means, coupled to outputs of said comparison means and said reference producing means, for multiplying said error signal by said reference signal and for producing a correction signal in accordance therewith; and, delay control means, coupled to an output of said multiplier means and to the delay control input of said controllable delay means, for controlling said controllable delay means so that said first signal is delayed by an amount intended to bring it into time correspondence with said second signal at which point said error signal reduces to zero.

2. A servo loop processor as claimed in claim 1, including:

first envelope means, connected to receive said first signal, for producing a first envelope signal related to the envelope of said first signal, said first envelope signal being applied to said controllable delay means; and, a second envelope means, connected to receive said second signal, for producing a second envelope signal related to the envelope of said second signal, said second envelope signal being applied to said comparison means and to said reference producing means.

3. A servo loop processor as claimed in claim 2 wherein said comparison means comprises a differential amplifier and wherein said delay control means includes an integrator connected to the output of said multiplier means.

4. A servo loop processor as claimed in claim 3 wherein said delay control means also includes a voltage controlled monostable multivibrator, the unstable state of said voltage control monostable multivibrator being controlled by the output of said integrator, the output of said voltage controlled monostable multivibrator being connected to said delay means for controlling the delay created by said controllable delay means.

5. A servo loop processor as claimed in claim 4 wherein said reference producing means comprises a differentiator connected to the output of said second envelope means and a sample-and-hold circuit connected to the output of said differentiator, the output of said sample-and-hold circuit forming the reference signal that is applied to said multiplier means.

6. A servo loop processor suitable for use in a passive radar range determining system adapted to receive video pulse trains, generated by a transmitting radar antenna, at two spaced receiving antennas, the envelopes of said video pulse trains overlapping to the point that they are almost, but not quite, coincident, said servo loop processor comprising:

a first envelope generating means connected to receive the earliest occurring video pulse train, for generating a first envelope signal related to the envelope of the waveform of said earliest video pulse train;

a second envelope generating means, connected to receive the latest occurring video pulse train, for generating a second envelope signal related to the envelope of the waveform of said latest video pulse train;

control means for controlling said first and second envelope generating means;

reference signal generating means connected to said second envelope generating means for generating a reference signal in accordance therewith, said reference signal having a quadrature relationship with said second envelope signal; and, servo loop means, connected to receive said reference signal, the output of said first envelope generating means and the output of said second envelope generating means, for controllably delaying the output of said first envelope generating means as a function of a multiplication of said reference signal by an error signal that represents the difference between said delayed output of said first envelope generating means and said output of said second envelope generating means, until said delayed output corresponds in time to the output of said second envelope generating means.

7. A servo loop processor suitable for use in a passive radar range determining system as claimed in claim 6 wherein said servo loop means includes a delay means connected to the output of said first envelope generating means for delaying the output thereof, and a differential amplifier connected to the output of said second envelope generating means and to the output of said delay means for comparing the output of said delay means with the output of said second envelope generating means and generating said error signal in accordance therewith.

8. A servo loop processor suitable for use in a passive radar range determining system as claimed in claim 7 wherein said servo loop also includes:

a multiplier, said multiplier connected to receive said error signal and said reference signal, multiply them together and generate a correction signal in accordance therewith;

an integrator connected to the output of said multiplier; and, a delay control connected to the output of said integrator, the output of said delay control being connected to said delay means to control the delay created by said delay means.

9. A servo loop processor suitable for use in a passive radar range determining system as claimed in claim 8 wherein said first and second envelope generating means comprise first and second sample-and-hold circuits, respectively, and wherein said control means comprises sample pulse multivibrators connected to apply sample commands to said first and second sample-and-hold circuits upon the occurrence of a main or a side lobe in one of said video pulse trains.

10. A servo loop processor suitable for use in a passive radar range determining system as claimed in claim 9 wherein said delay means comprises a third sample-and-hold circuit and wherein said delay control comprises a voltage controlled monostable multivibrator having its unstable state control input connected to the output of said integrator and its trigger input connected to an output of said sample pluse multivibrators, the output of said voltage controlled monostable multivibrator connected to the command input of said third sample-and-hold circuit.

11. A servo loop processor suitable for use in a passive radar range determining system as claimed in claim 10 wherein said reference signal generating means comprises a differentiator connected to the output of said second sample-and-hold circuit and a fourth sample-and-hold circuit connected to the output of said differentiator, the output of said fourth sample-and-hold circuit forming said reference signal and being connected to said multiplier, said fourth sample-and-hold circuit being connected to an output of said sample pulse multivibrator so as to be sample commanded slightly after the triggering of said first and second sample-and-hold circuits.

12. A servo loop processor as claimed in claim 1 wherein said reference producing means includes means for causing said reference signal to be substantially in quadrature with said second signal.

13. A servo loop processor as claimed in claim 12 wherein said reference producing means comprises signal subtraction means for producing said reference signal by subtracting a delayed version of said second signal from said second signal.

14. A servo loop processor as claimed in claim 13, further comprising:

first envelope detection means, connected to receive said first signal, said first envelope detection means including sample-and-hold circuit means for producing a first envelope signal that is a stepwise representation of the envelope of said first signal, said first envelope signal being applied to said delay means; and, a second envelope detection means, connected to receive said second signal, said second envelope detection means including sample-and-hold circuit means for producing a second envelope signal that is a stepwise representation of the envelope of said second signal, said second envelope signal being applied to said comparison means and to said reference producing means.

15. A servo loop processor as claimed in claim 14 wherein said reference producing means comprises:

differentiator means for differentiating said second envelope signal to produce a bipolar pulse train signal; and, an additional sample-and-hold circuit means for detecting the envelope of said biopolar pulse train signal produced by said differentiator means, said additional sample-and-hold circuit means producing said reference signal.

16. A servo loop processor as claimed in claim 13 wherein said subtraction means of said reference producing means comprises a fixed delay means for receiving said second signal and delaying it by a first predetermined interval, and a difference taking means for receiving said second signal and for receiving the delayed second signal at the output of said fixed delay means, said difference taking circuit means having an output producing said reference signal that is the difference between said second signal and said second signal delay by said fixed delay interval.

17. A servo loop processor as claimed in claim 16 wherein said fixed delay means has a second delay output that produces a version of said second signal delayed by a second predetermined interval that is less than said first predetermined interval, and further comprising an additional fixed delay means connected in series with said controllable delay means so that said first signal is delayed by a controllable amount in said controllable delay means and by said second predetermined interval in said additional fixed delay means, and said comparison means is connected to said second output of said fixed delay means for receiving said second signal delayed by said second predetermined interval, and said comparison means is connected to receive said first signal delayed by both said controllable delay means and the serially connected additional fixed delay means, whereby said delay control means is responsive to said error signal and said reference signal for operating said delay control input of said controllable delay means so as to delay said first signal as it appears at said comparison means by an amount tending to bring said first signal into time correspondence with the version of said second signal delayed by said second predetermined interval.

18. A servo loop processor as claimed in claim 2, further comprising:

first analog-to-digital conversion means connected to said first envelope means for digitally encoding said first envelope signal and applying the resulting digitally encoded first envelope signal to said controllable delay means; and, a second analog-to-digital conversion means connected to said second envelope means for digitally encoding said second envelope signal and for coupling the digitally encoded second envelope signal to said comparison means and said reference producing means.

19. A servo loop processor suitable for use in a passive system for monitoring a radar signal source that transmits a train of video pulses, and in which the passive system is associated with antennas that receive the pulse train at a finite time differential characterized by the envelopes of the received video pulse trains overlapping to the point that they are almost, but not quite, coincident, said servo loop processor comprising:

first envelope detection means connected to receive the earliest occurring video pulse train, for generating a first envelope signal related to the envelope of said earliest occurring video pulse train;

second envelope detection means, connected to receive the latest occurring video pulse train, for generating a second envelope signal related to the envelope of said latest occurring video pulse train;

first fixed delay means for receiving said second envelope signal and having a first delay output producing a version of said second envelope signal delayed by a first predetermined interval, and having a second delay output for producing a version of said second envelope signal having a second predetermined delay interval, wherein said second predetermined delay interval is less than said first predetermined delay interval;

a controllable delay means, connected to receive said first envelope signal, for delaying said first envelope signal, said controllable delay means having a delay control input;

a second fixed delay means connected in series with said controllable delay means for delaying said first envelope signal by an additional amount equal to said second predetermined delay interval of said second output of said first fixed delay means;

comparison means for receiving said first envelope signal after it has been delayed by said controllable delay means and by said second fixed delay means, and for receiving said second envelope signal from said second output of said first fixed delay means and thus after said second envelope signal has been delayed by said second predetermined interval, said comparison means comparing the thusly delayed first and second envelope signals and generating an error signal relating to the difference therebetween;

reference signal subtraction means coupled to the first output of said fixed delay means and to said second envelope detection means for subtracting said first envelope signal delayed by said first predetermined interval from the undelayed first envelope signal so as to produce a reference signal having a predetermined phase relationship with said second envelope signal;

multiplier means coupled to receive said reference signal from said reference signal subtraction means and to receive said error signal from said comparison means, and for multiplying said error signal by said reference signal to produce a correction signal in accordance therewith; and, delay control means coupled to an output of said multiplier means and to said delay control input of said controllable delay means, for controlling said controllable delay means so that said first envelope signal as delayed and applied to said comparison means is controllably delayed by an amount tending to bring it into time correspondence with said second envelope signal delayed by said second predetermined interval and applied to said comparison means.

20. A servo loop processor as claimed in claim 19, further comprising:

first analog-to-digital conversion means connected between said first envelope detection means and the serially connected controllable time delay means and second fixed time delay means, for digitally encoding said first envelope signal prior to it being applied to said controllable time delay means and said second fixed time delay means; and second analog-to-digital conversion means connected between said second envelope detection means and said first fixed interval delay means, for digitally encoding said second envelope signal prior to it being applied to said first fixed time delay means.

21. A servo loop processor as claimed in claim 20 wherein said reference signal subtraction means comprises a digital subtractor, and said reference signal produced thereby is digitally encoded; and wherein said comparison means comprises a digital subtractor, and said error signal produced thereby is digitally encoded.

22. A servo loop processor as claimed in claim 21 wherein said multiplier means comprises means for digitally multiplying said digitally encoded error signal by said digitally encoded reference signal to produce a digitally encoded correction signal.

* * * * *